(12) United States Patent
Lee et al.

(10) Patent No.: US 11,274,888 B2
(45) Date of Patent: Mar. 15, 2022

(54) INTERCOOLER OF VEHICLE

(71) Applicants: HYUNDAI MOTOR COMPANY, Seoul (KR); KIA MOTORS CORPORATION, Seoul (KR)

(72) Inventors: Jun Hee Lee, Hwaseong-si (KR); Jang Sin Lee, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 23 days.

(21) Appl. No.: 16/860,712

(22) Filed: Apr. 28, 2020

(65) Prior Publication Data

US 2021/0164741 A1 Jun. 3, 2021

(30) Foreign Application Priority Data

Nov. 28, 2019 (KR) .................. 10-2019-0155952

(51) Int. Cl.
| | |
|---|---|
| *F28D 15/00* | (2006.01) |
| *F28F 27/02* | (2006.01) |
| *F02M 35/10* | (2006.01) |

(52) U.S. Cl.
CPC ....... *F28F 27/02* (2013.01); *F02M 35/10157* (2013.01); *F02M 35/10268* (2013.01); *F28F 2250/06* (2013.01)

(58) Field of Classification Search
CPC .. F02B 29/0493; F02B 29/0418; F02B 29/04; F02B 29/0475; F02B 29/0437; F02B 29/0425; F01P 2060/02; F01P 7/12; F01P 7/10; F01P 7/165; F01P 11/10; F01P 7/14; F01P 1/00; F01P 7/02; F01P 7/026; F01P 7/048; F01P 7/16; F02M 26/32; F02M 35/10262; F28F 27/02; F28F 2009/029; F28F 2250/06; F28F 9/0268; F28D 2021/0082; F28D 7/163; F28D 9/00

See application file for complete search history.

(56) References Cited

U.S. PATENT DOCUMENTS

| | | | | |
|---|---|---|---|---|
| 1,739,507 | A | * 12/1929 | De Lorenzi | ............. F23L 15/02 165/4 |
| 4,558,731 | A | * 12/1985 | Pentikainen | ............ F28D 17/04 137/309 |
| 4,706,461 | A | * 11/1987 | Pratt | ......................... F01P 7/12 123/41.04 |

(Continued)

FOREIGN PATENT DOCUMENTS

| | | | | |
|---|---|---|---|---|
| FR | 3042031 A1 | * 4/2017 | ........... | B60K 11/085 |
| JP | 2017172539 A | * 9/2017 | ........... | Y02T 10/146 |
| KR | 2019-0012615 A | 2/2019 | | |

*Primary Examiner* — George C Jin
*Assistant Examiner* — Teuta B Holbrook
(74) *Attorney, Agent, or Firm* — McDonnell Boehnen Hulbert & Berghoff LLP (57) ABSTRACT

An intercooler of a vehicle includes a plurality of tubes arranged straight so that a charging air passes through the tubes, a shutter installed to open and close inlets of at least two of the tubes as the tubes move straight along a direction in which the tubes are arranged, and an actuator provided to move the shutter straight. The plurality of tubes are divided into adjustment tubes that can be opened and closed by the shutter and cooling tubes that are always opened regardless of the shutter, and the adjustment tubes are located on lower sides of the cooling tubes.

7 Claims, 9 Drawing Sheets

(56) References Cited

U.S. PATENT DOCUMENTS

| | | | | |
|---|---|---|---|---|
| 2005/0016723 A1* | 1/2005 | Araki | B60H 1/00028 165/202 |
| 2005/0269071 A1* | 12/2005 | Simmet | B60H 1/0005 165/202 |
| 2006/0144582 A1* | 7/2006 | Sekiya | B60H 1/00857 165/202 |
| 2007/0125521 A1* | 6/2007 | Itou | B60H 1/00028 165/96 |
| 2007/0175612 A1* | 8/2007 | Hendrix | F02B 29/0456 165/101 |
| 2009/0025904 A1* | 1/2009 | Tokunaga | B60H 1/00471 165/58 |
| 2009/0025905 A1* | 1/2009 | Tokunaga | B60H 1/00028 165/59 |
| 2009/0090495 A1* | 4/2009 | Domes | F28F 13/14 165/165 |
| 2013/0067912 A1* | 3/2013 | Eilemann | F28D 7/0091 60/599 |
| 2014/0325959 A1* | 11/2014 | McConville | F02B 29/0431 60/273 |
| 2018/0164055 A1* | 6/2018 | Veilleux, Jr | B60K 11/04 |
| 2019/0390593 A1* | 12/2019 | Li | F28F 27/00 |
| 2020/0208925 A1* | 7/2020 | Shidara | F01P 7/12 |

\* cited by examiner

INTERCOOLER OF VEHICLE

CROSS REFERENCE TO RELATED APPLICATION

The present application claims priority of Korean Patent Application No. 10-2019-0155952 filed on Nov. 28, 2019, the entire contents of which is incorporated herein for all purposes by this reference.

BACKGROUND

Field

The present disclosure relates to an intercooler for cooling air compressed in a charger of a vehicle.

Description of the Related Art

A charger, such as a turbocharger, is used to improve an output of an engine by increasing an intake air amount of the engine through compression of air sucked into the engine.

However, if the air is compressed in the charger, the temperature of the air is increased to lower the density thereof, and the compressed air is cooled through an intercooler to heighten the density thereof, so that the cooled air with the density heightened is supplied to the engine.

The intercooler is configured to cool the air discharged from the charger through heat exchange between a plurality of tubes through which the discharged air passes and cold outdoor air or cooling water and to supply the cooled air to a combustion chamber of the engine.

The amount or the temperature of the compressed air flowing from the charger to the intercooler is changed in accordance with the operation situation of the charger, and under the condition that an ambient temperature is relatively quite low such as in cold winter season, the air passing through the intercooler may be overcooled.

In particular, in a below zero ambient temperature situation in which the engine operates in low-speed and low-load areas, a small amount of air is supplied to the intercooler at a relatively low temperature. In this case, because the ambient temperature for cooling the intercooler becomes very low, the air passing through the intercooler may be overcooled to cause a large amount of condensate water to be generated, and the generated condensate water may be frozen while the vehicle is being parked or left outdoors in cold weather for a long time.

If the condensate water is frozen in the intercooler, the tube that is an air path passing through the intercooler may be clogged, and this may cause the vehicle startup inferiority and output deterioration phenomena.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure is proposed to solve the above-mentioned problems, and an object of the present disclosure is to provide an intercooler of a vehicle capable of stably securing a smooth startup of an engine and preventing an engine output deterioration phenomenon due to freezing of condensate water by reducing or preventing overcooling of air that is cooled while passing from a charger to the intercooler and generation of the condensate water.

In order to achieve the above object, an intercooler of a vehicle according to the present disclosure may include a plurality of tubes arranged straight so that a charging air passes through the tubes; a shutter installed to open and close inlets of at least two of the tubes as the tubes move straight along a direction in which the tubes are arranged; and an actuator provided to move the shutter straight.

The plurality of tubes may be divided into adjustment tubes that can be opened and closed by the shutter and cooling tubes that are always opened regardless of the shutter, and the adjustment tubes may be located on lower sides of the cooling tubes.

The adjustment tubes and the cooling tubes may be deployed at equal intervals in upper and lower directions.

The cooling tubes may be deployed at closer intervals than intervals of the adjustment tubes.

The shutter may be composed of a plate on which two openings and three shutter portions are deployed along a direction in which the tubes are deployed, the two openings may be configured to have different widths in their upper and lower directions, and the three shutter portions may be configured to have different widths in their upper and lower directions.

The three shutter portions may be formed to have the widths being narrowed in the upper and lower directions as the shutter portions are located on upper sides, and the two openings may be formed to have the widths being narrowed in the upper and lower directions as the openings are located on lower sides.

The width of the adjustment tube in the upper and lower directions may be constantly A, an interval between the adjustment tubes may be constantly 2A, the shutter portions may be formed to have the different widths of A, 1.5A, and 2A in the upper and lower directions as the shutter portions are located on upper sides, and the openings may be formed to have the different widths of 1.5A and A in the upper and lower directions as the openings are located on upper sides.

A support guide may be provided at the inlets of the tubes to guide the straight movement of the shutter.

The actuator may be configured to include a rack integrally provided on the shutter; and a motor provided to drive a pinion tooth-engaged with the rack.

According to the present disclosure, because it is possible to reduce or prevent the overcooling of the air that is cooled while passing from the charger to the intercooler and the generation of the condensate water, the smooth startup of the engine can be stably secured, and the engine output deterioration phenomenon due to the freezing of the condensate water can be prevented from occurring.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION OF PREFERRED EMBODIMENTS

With reference to FIGS. 1 to 6, an intercooler of a vehicle according to the present disclosure is configured to include a plurality of tubes 1 arranged straight so that a charging air passes through the tubes, a shutter 3 installed to open and close inlets of at least two of the tubes as the tubes 1 move straight along a direction in which the tubes 1 are arranged, and an actuator provided to move the shutter 3 straight.

According to the present disclosure, the inlets of the plurality of tubes 1 arranged straight can be opened and closed using the shutter 3. That is, by blocking the inlets of some tubes through the shutter 3 in a situation in which overcooling of the charging air or generation of condensate water is concerned, it is possible to reduce or prevent the overcooling of the charging air and the generation of the condensate water.

As described above, if the generation of the condensate water is reduced or prevented, it is possible to prevent startup inferiority or engine output deterioration due to freezing of the condensate water although the vehicle is parked or left outdoors in cold weather for a long time.

In embodiments of the present disclosure, the plurality of tubes 1 are configured to be divided into adjustment tubes 1-1 that can be opened and closed by the shutter 3 and cooling tubes 1-2 that are always opened regardless of the shutter 3, and the adjustment tubes 1-1 are located on lower sides of the cooling tubes 1-2.

That is, the plurality of tubes 1 are configured to be deployed straight in upper and lower directions, and the adjustment tubes 1-1 are configured to be located on lower sides, whereas the cooling tubes 1-2 are configured to be located on upper sides.

Figure 6A:
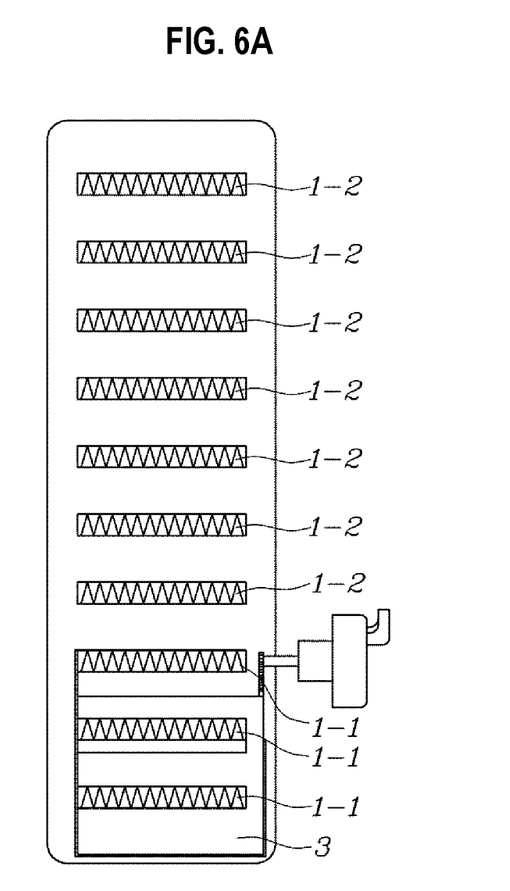
FIGS. 6A and 6B are views illustrating different embodiments of the present disclosure in a comparison manner.

With reference to FIG. 6A, the adjustment tubes 1-1 and the cooling tubes 1-2 are deployed at equal intervals in upper and lower directions, and an embodiment on the right side has a configuration in which the cooling tubes 1-2 are deployed at closer intervals than the intervals of the adjustment tubes 1-1.

Figure 6B:
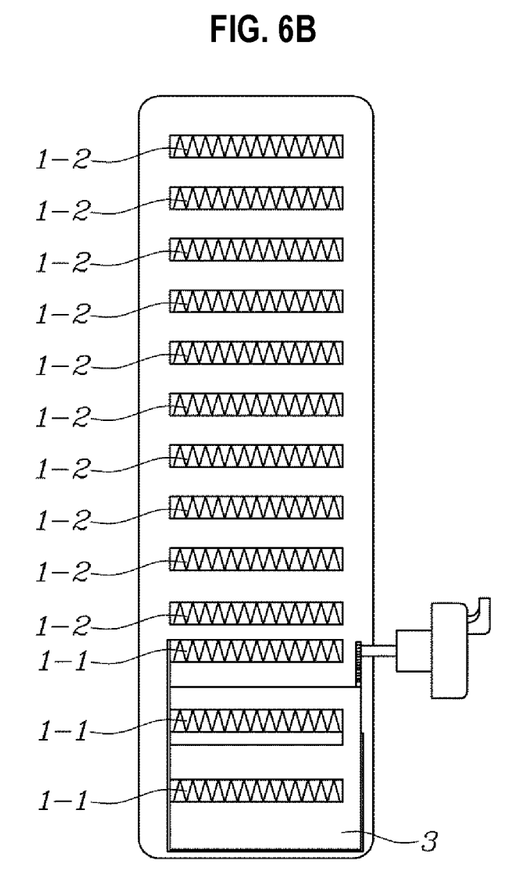

As compared with FIG. 6A, FIG. 6B has three adjustment tubes 1-1 equally to the number of adjustment tubes 1-1 in FIG. 6A, but has a larger number of cooling tubes 1-2 than the number of cooling tubes 1-2 in FIG. 6A. Accordingly, FIG. 6B may be an embodiment that gives priority to securing of the cooling performance.

Figure 1:
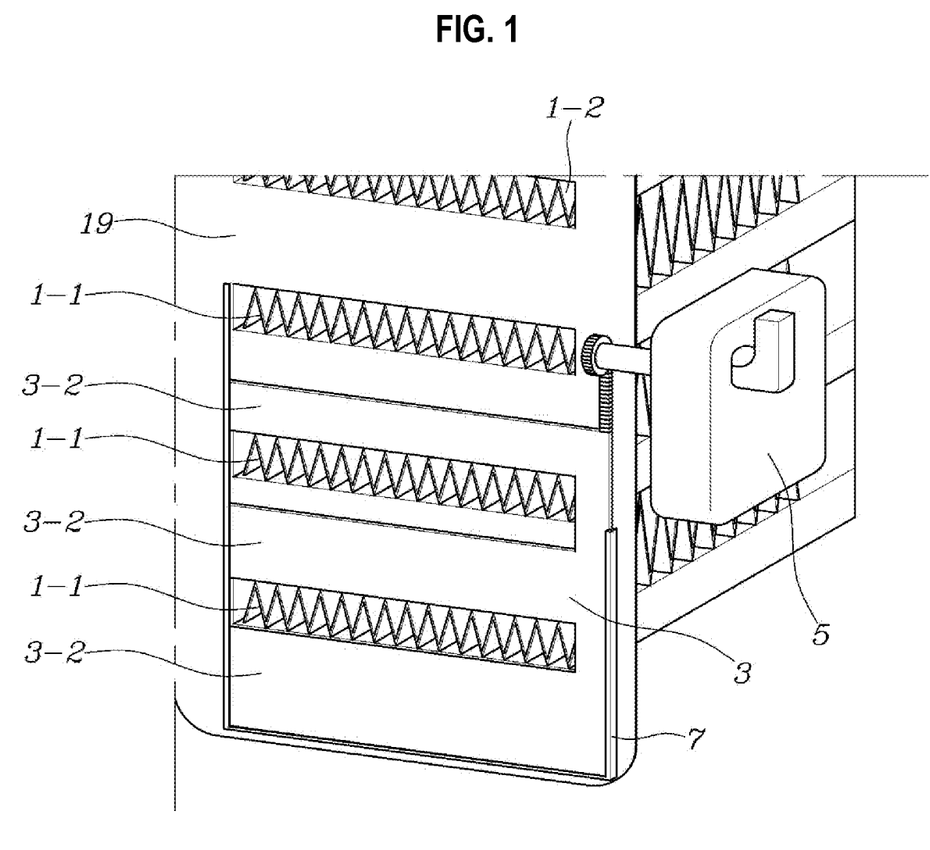
FIG. 1 is a view illustrating primary portions of an intercooler of a vehicle according to the present disclosure.
Figure 2:
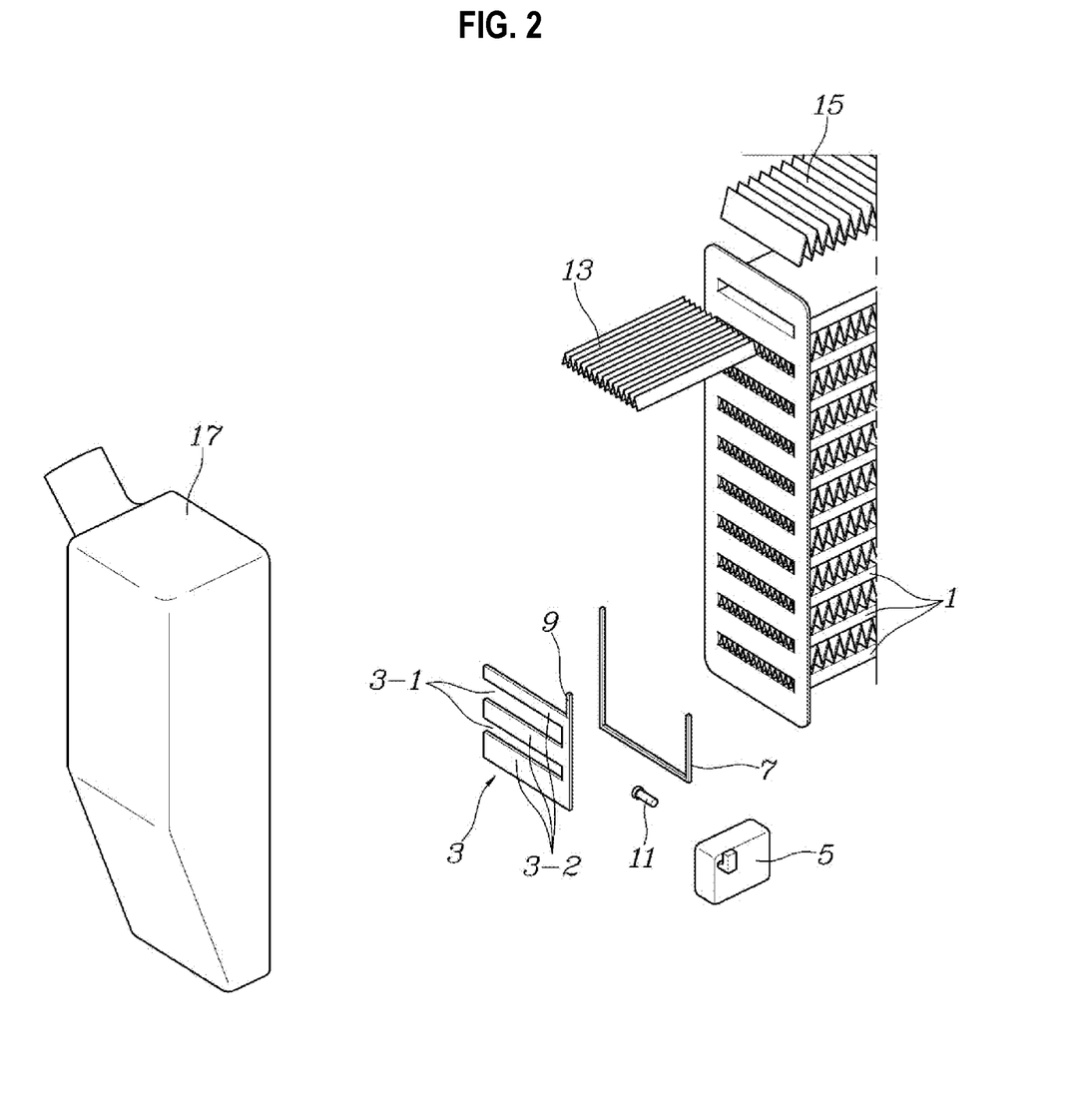
FIG. 2 is an exploded view illustrating primary portions of an intercooler according to the present disclosure.

Referring to FIG. 2, the shutter is commonly composed of a plate on which two openings 3-1 and three shutter portions 3-2 are deployed along a direction in which the tubes 1 are deployed. The two openings 3-1 are configured to have different widths in their upper and lower directions, and the three shutter portions 3-2 are configured to have different widths in their upper and lower directions.

The three shutter portions 3-2 are formed to have the widths being narrowed in the upper and lower directions as the shutter portions are located on upper sides, and the two openings 3-1 are formed to have the widths being narrowed in the upper and lower directions as the openings are located on lower sides.

Figure 4:
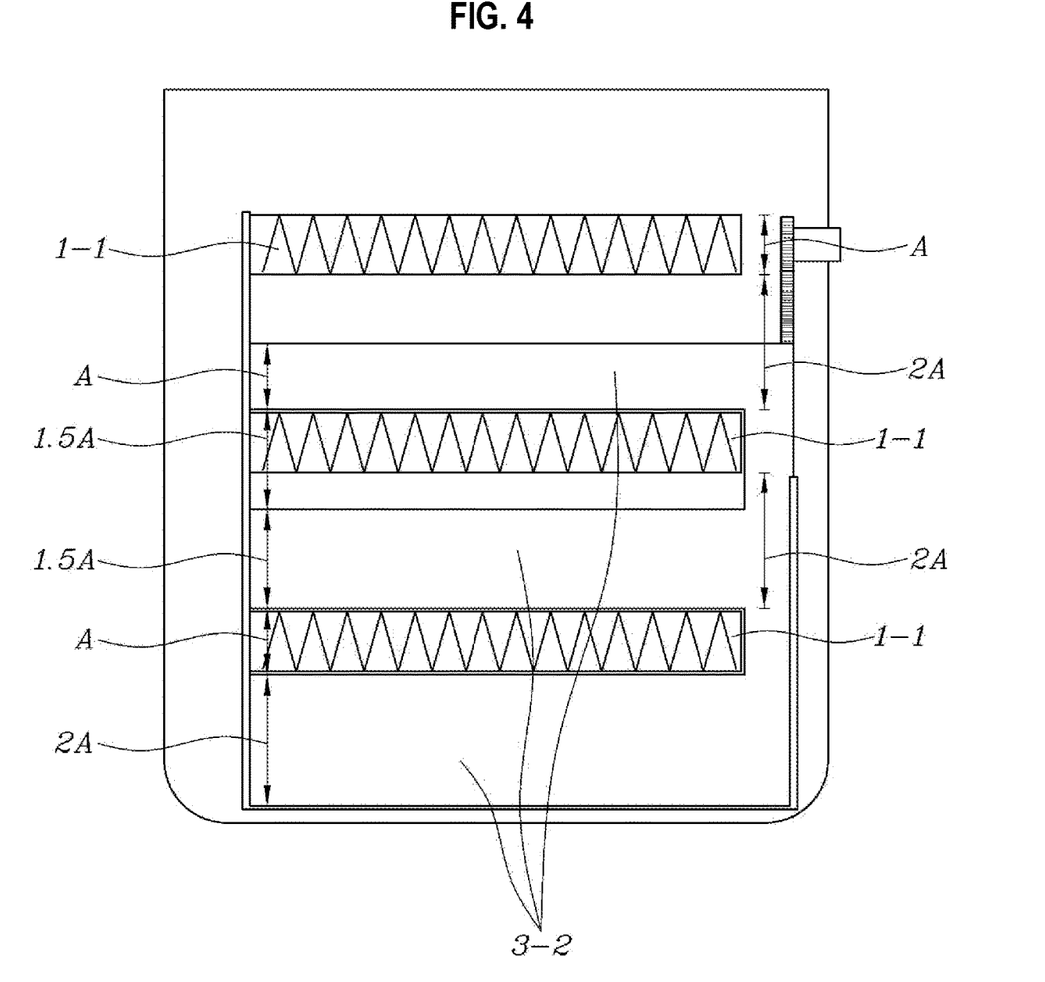
FIG. 4 is a view explaining a detailed embodiment of a shutter and adjustment tubes of an intercooler according to the present disclosure.

More specifically, with reference to FIG. 4, on the assumption that the width of the adjustment tube 1-1 in the upper and lower directions is A, the width of the adjustment tubes 1-1 in the upper and lower directions is constantly A, and an interval between the adjustment tubes 1-1 is constantly 2A. The shutter portions 3-2 are formed to have the different widths of A, 1.5A, and 2A in the upper and lower directions as the shutter portions are located on the upper sides, and the openings 3-1 are formed to have the different widths of 1.5A and A in the upper and lower directions as the openings are located on the upper sides.

Figure 5:
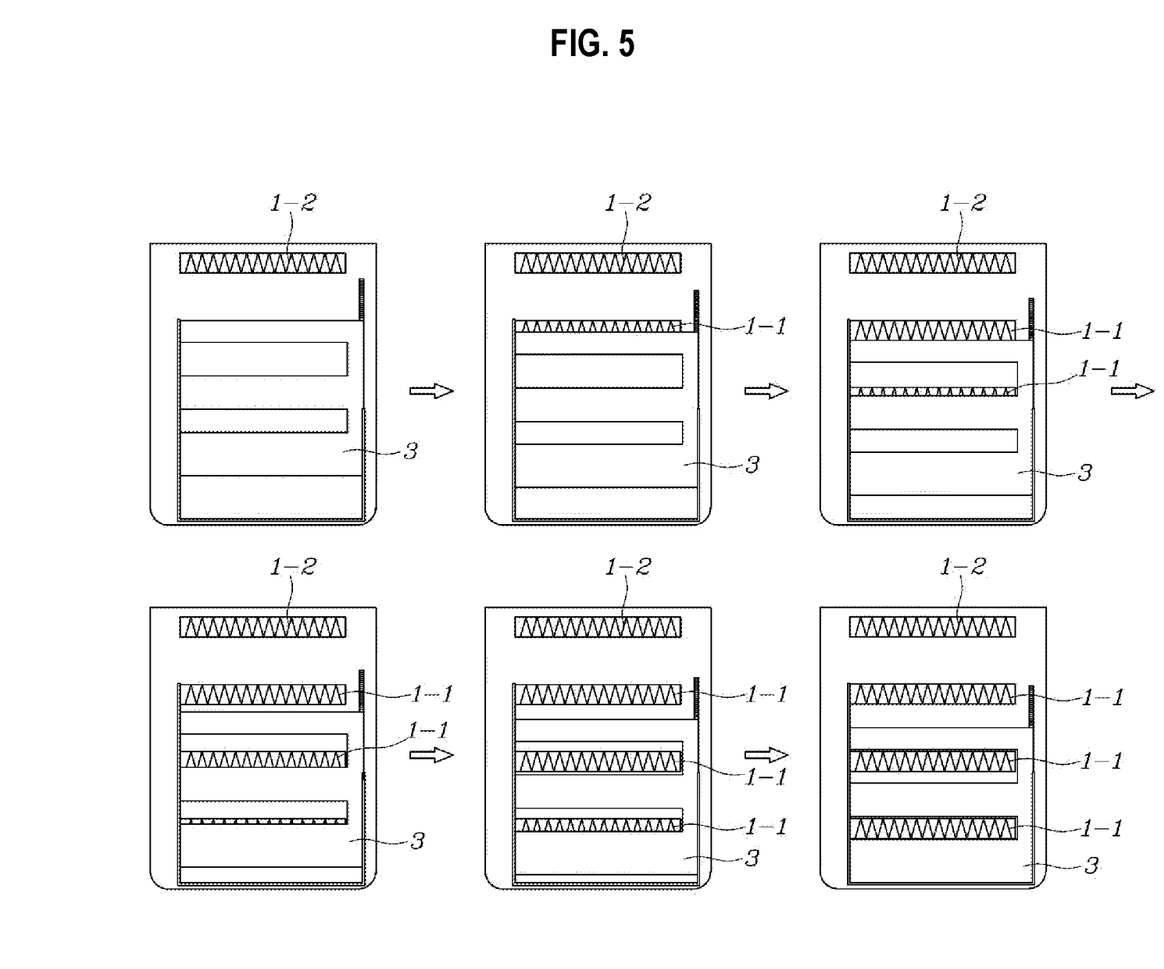
FIG. 5 is a view illustrating in order a process in which a shutter adjusts adjustment tubes from closed states to open states in an intercooler of FIG. 1.
Figure 7:
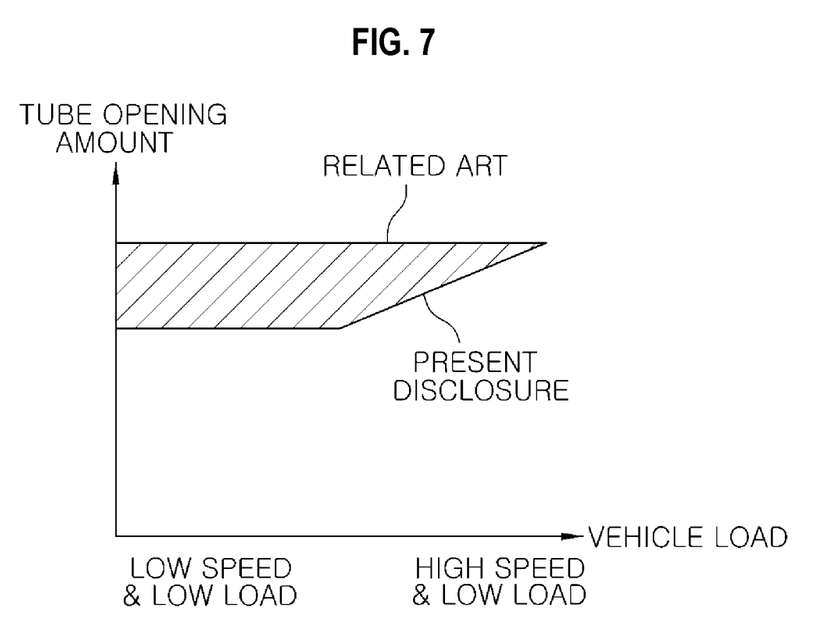
FIG. 7 is a graph explaining that a tube opening amount of an intercooler according to the present disclosure is changed in accordance with a load of a vehicle.
Figure 8:
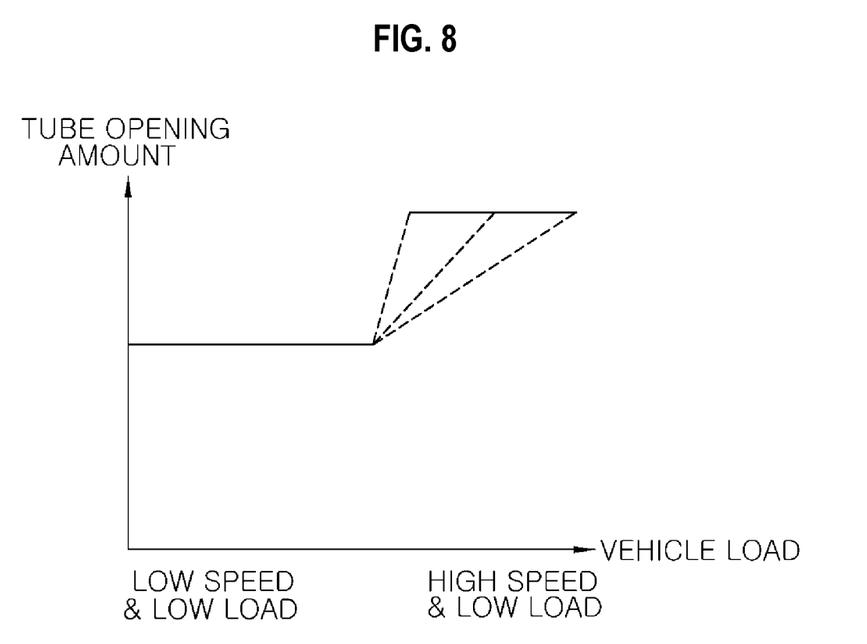
FIG. 8 is a graph explaining that speed adjustment of a tube opening amount is possible by controlling a shutter in accordance with a vehicle load through driving of a motor.

Through the above-described dimension relationship, if the shutter 3 moves up and down through driving of a motor 5 constituting the actuator, it is possible to adjust the three adjustment tubes 1-1 from closed states to open states as illustrated in FIG. 5. In this case, the overall inlet opening rate of the adjustment tubes 1-1 is gradually increased or decreased, and as a result, an inlet opening amount of the tubes 1 (hereinafter, simply expressed as "tube opening amount") can be linearly varied in accordance with the load of the vehicle as illustrated in FIGS. 7 and 8.

Referring again to FIGS. 2 and 3, a support guide 7 is provided at the inlets of the tubes 1 to guide the straight movement of the shutter 3, and the actuator is configured to include a rack 9 integrally provided on the shutter 3, and a motor 5 provided to drive a pinion 11 tooth-engaged with the rack 9.

Figure 3:
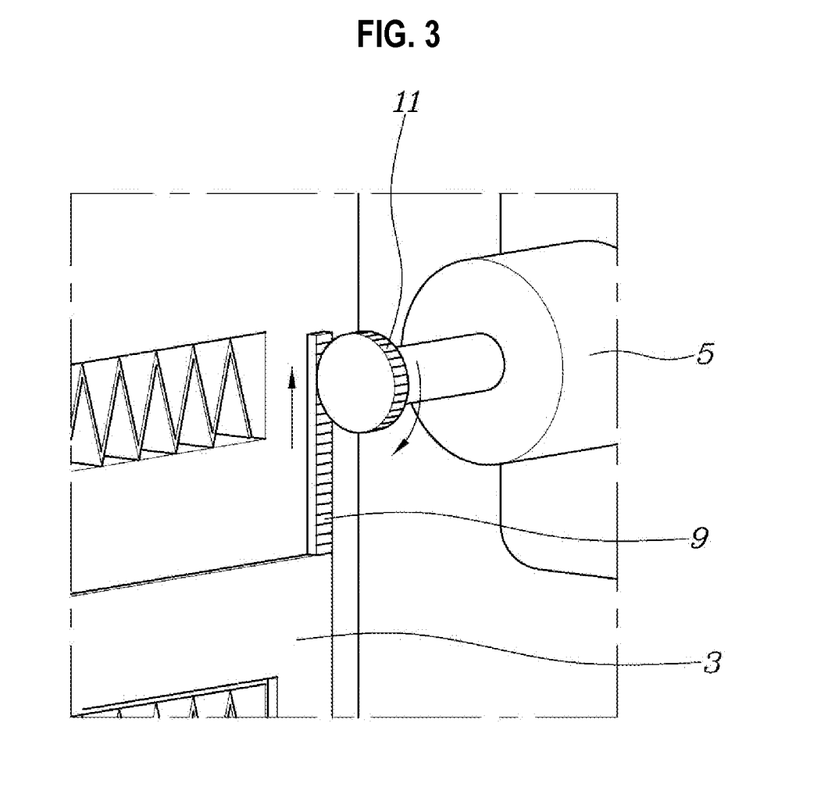
FIG. 3 is a view explaining an actuator driving a shutter in an intercooler of FIG. 1.

Accordingly, if the motor 5 is driven, the rack 9 moves straight, and thus the shutter 3 ascends and descends to adjust the opening rate of the adjustment tubes 1-1.

Further, it is preferable that the motor 5 is configured to be controlled by a controller that receives an input of an ambient temperature of the vehicle and adjusts the inlet opening amount of the tube 1 to a proper level through driving of the motor 5.

For reference, with reference to FIG. 2, inner cooling fins 13 are installed inside the tubes 1, and outer cooling fins 15 are installed outside the tubes 1 to increase the heat exchanging areas. A plate-shaped header 19 (shown in FIG. 1) is provided on inlet sides of the tubes 1, and the components, such as the shutter 3 and the actuator, are configured to be accommodated inside an inlet tank 17 having a space provided therein to supply the charging air from the charger to the inlets of the tubes 1 at a time.

An outlet tank is provided on opposite sides of the tubes 1 to gather the air being cooled while passing through the tubes 1 and to supply the gathered air to the engine.

With reference to FIG. 7, as the load of the vehicle is changed, the tube opening amount can be adjusted through driving of the motor 5 as described above. In the related art in which the shutter 3 according to the present disclosure is not provided, the tube opening amount is constant regardless of the change of the vehicle load, whereas in the present disclosure, the tube opening amount can be continuously and linearly varied in accordance with the change of the vehicle load. Accordingly, as compared with the related art, a relatively small tube opening amount can be formed in low-speed and low-load areas, and thus the overcooling of the charging air and the generation of the condensate water can be reduced to that extent. Accordingly, the hatched area in FIG. 7 may be interpreted as a reduction amount of the condensate water generation due to the overcooling of the charging air.

With reference to FIG. 8, it is expressed by a plurality of dotted lines that the speed adjustment of the tube opening amount becomes possible by controlling the shutter 3 in accordance with the vehicle load through driving of the motor 5. According to the present disclosure, the tube opening amount can be adjusted with different slopes even with respect to increase/decrease of the vehicle load at the same level, and thus it is possible to adjust the optimum tube opening amount in consideration of various vehicle situations, such as an ambient temperature of the vehicle and an engine output requirement amount.

Although the preferred embodiments of the present disclosure have been illustrated and described for illustrative purposes, those of ordinary skill in the art will appreciate that various modifications, additions and substitutions are possible, without departing from the scope and spirit of the present disclosure as disclosed in the accompanying claims.

What is claimed is:

1. An intercooler of a vehicle, comprising:
   a plurality of tubes arranged straight so that a charging air passes through the tubes;
   a shutter installed to open and close inlets of at least two of the tubes as the tubes move straight along a direction in which the tubes are arranged; and
   an actuator provided to move the shutter straight;
   wherein the plurality of tubes comprise adjustment tubes that can be opened and closed by the shutter, and cooling tubes that are always open, the adjustment tubes being positioned underneath the cooling tubes;
   wherein the shutter is composed of a plate in which two openings and three shutters are deployed along a direction in which the tubes are arranged, wherein the two openings are configured to have different widths in a vertical direction, and the three shutters are configured to have different widths in a vertical direction.

2. The intercooler according to claim 1, wherein the adjustment tubes and the cooling tubes are deployed at equal intervals in the vertical direction.

3. The intercooler according to claim 1, wherein the cooling tubes are deployed at closer intervals than intervals of the adjustment tubes.

4. The intercooler according to claim 1, wherein the widths of the three shutter portions decrease in the vertical direction from the lowest shutter portion to the highest shutter portion, and
   the widths of the two openings decrease in the vertical direction from the lower opening to the higher opening.

5. The intercooler according to claim 1, wherein the width of the adjustment tubes is constantly A,
   an interval between the adjustment tubes is constantly 2A,
   the widths of the shutter portions are A, 1.5A, and 2A, which decrease in the vertical direction from the lowest shutter portion to the highest shutter portion, and
   the widths of the two openings are 1.5A and A, which decrease in the vertical direction from the lower opening to the upper opening.

6. The intercooler according to claim 1, wherein a support guide is provided at the inlets of the tubes to guide the straight movement of the shutter.

7. The intercooler according to claim 1, wherein the actuator is configured to comprise:
   a rack integrally provided on the shutter; and
   a motor provided to drive a pinion tooth-engaged with the rack.

\* \* \* \* \*